June 28, 1927.
F. V. DONALD
1,633,850
FOUR-WHEELED TRACTOR
Filed Jan. 3, 1921
4 Sheets-Sheet 4
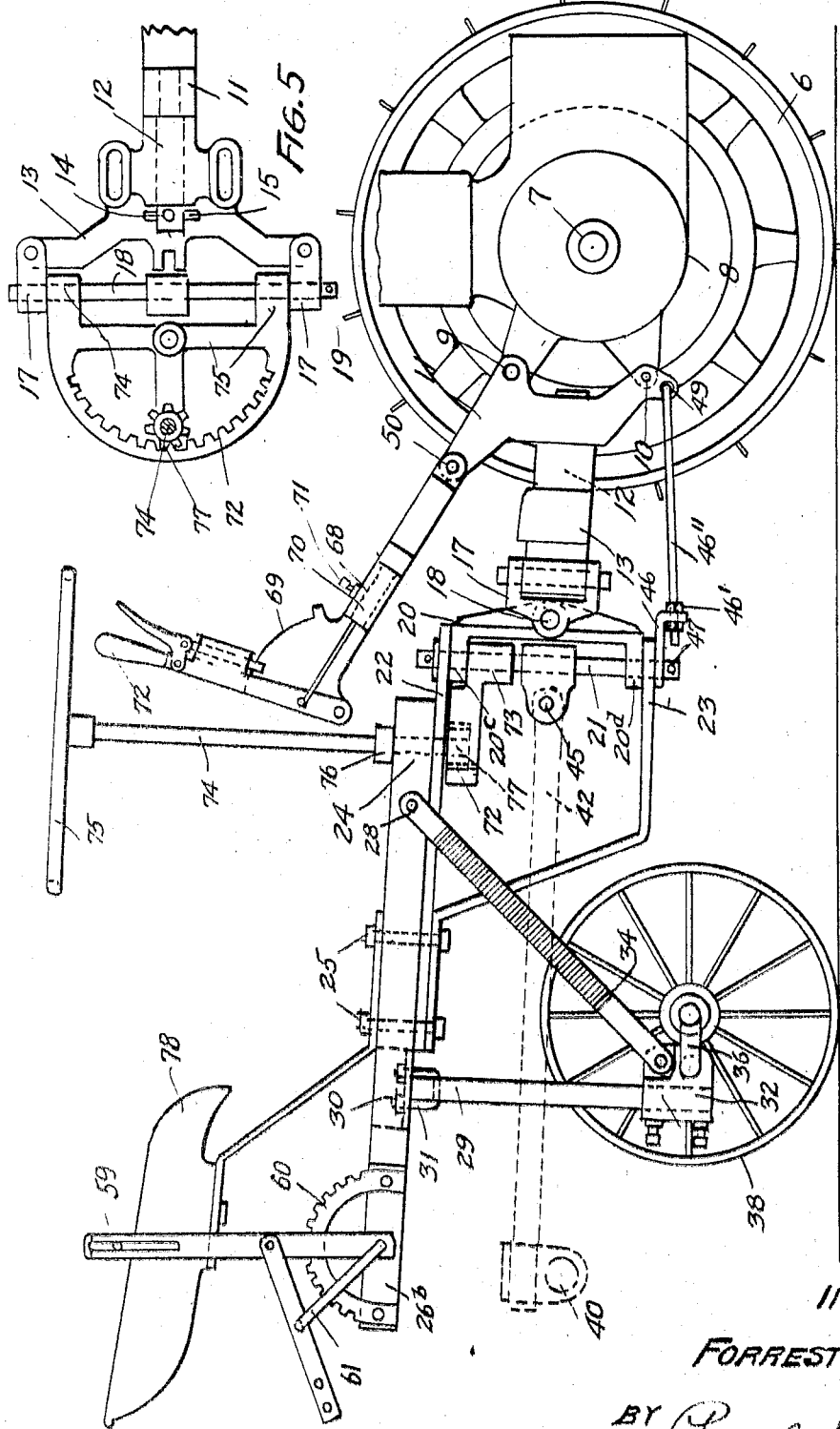
INVENTOR
FORREST V. DONALD
BY
HIS ATTORNEYS Patented June 28, 1927.

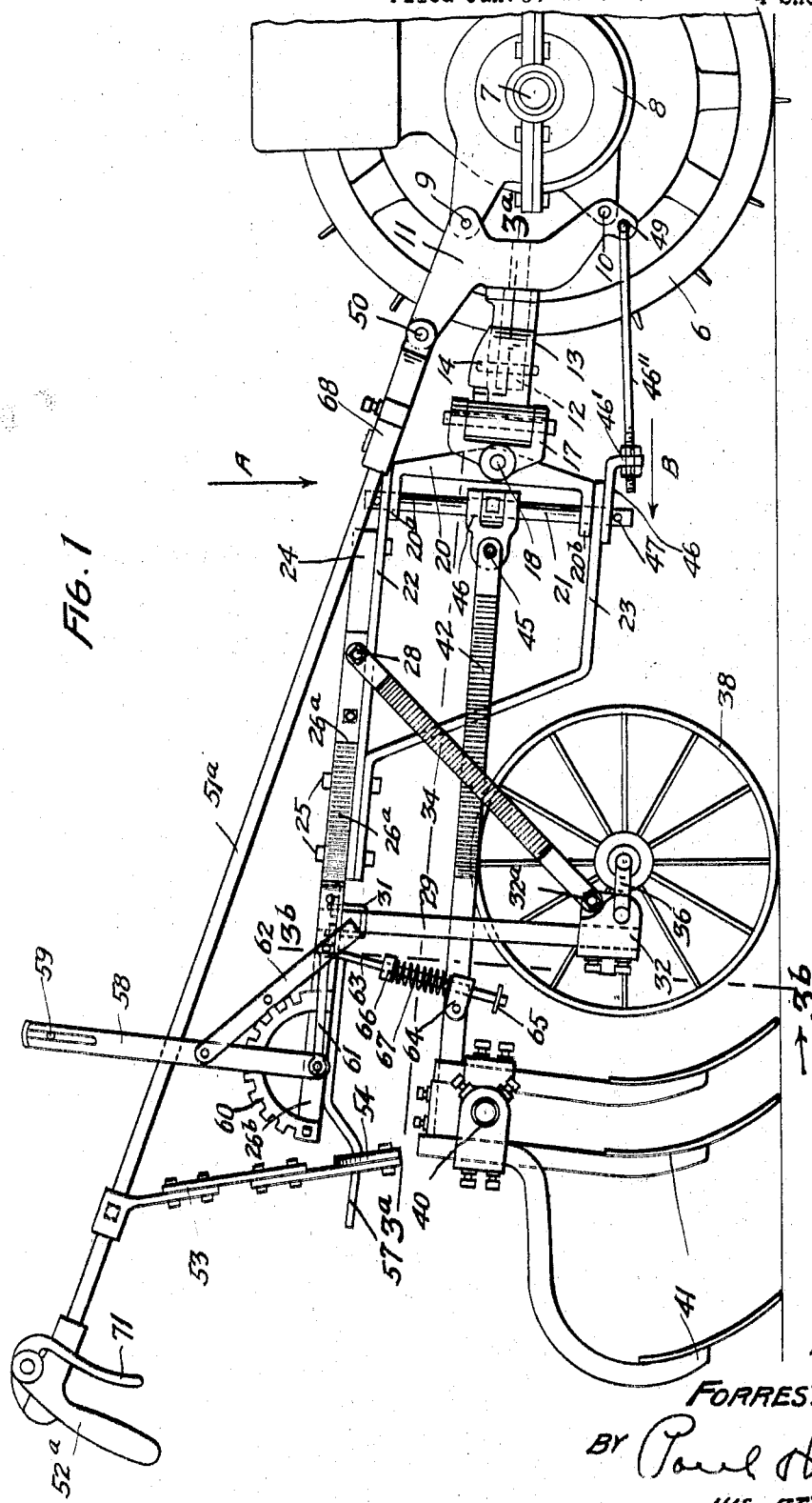

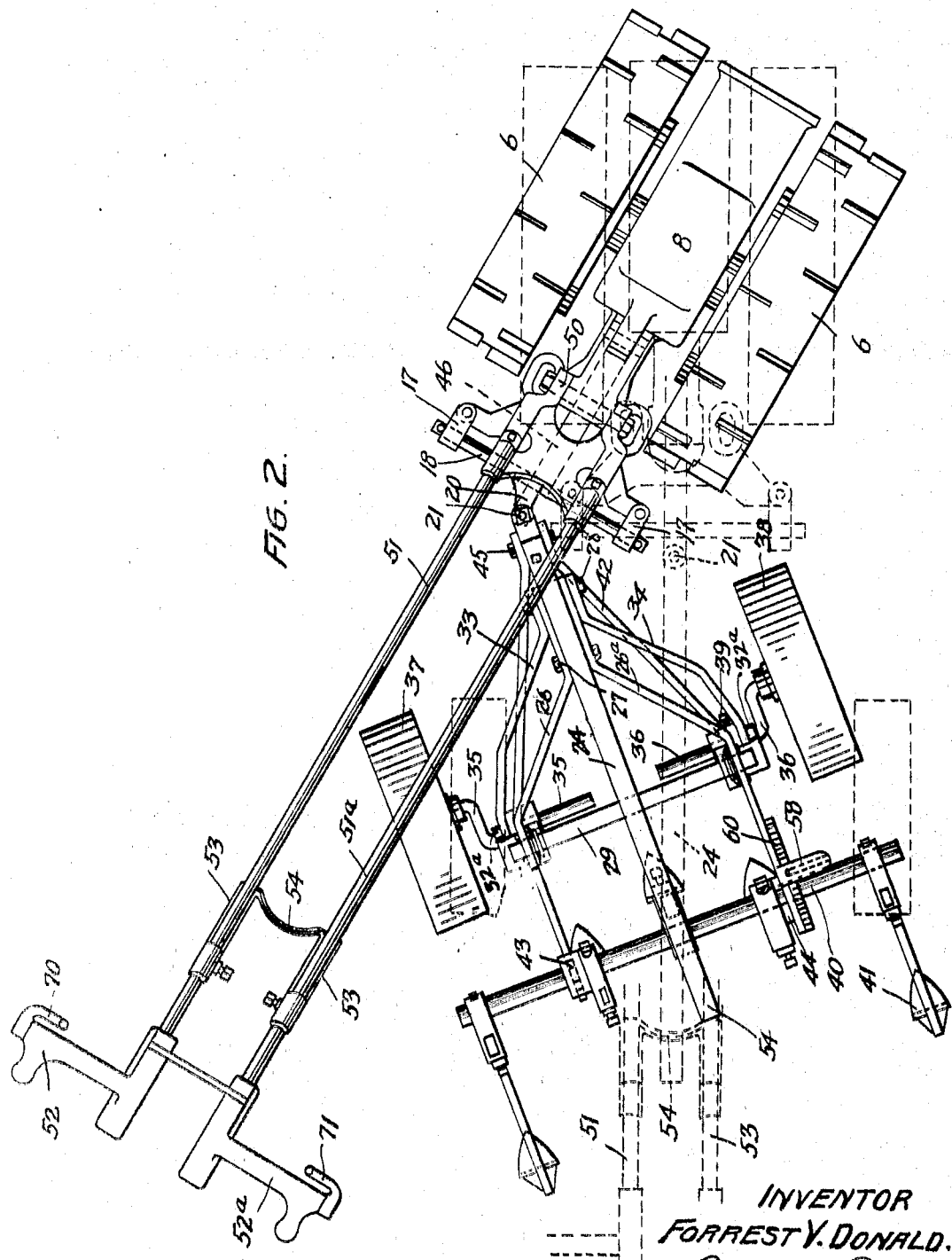

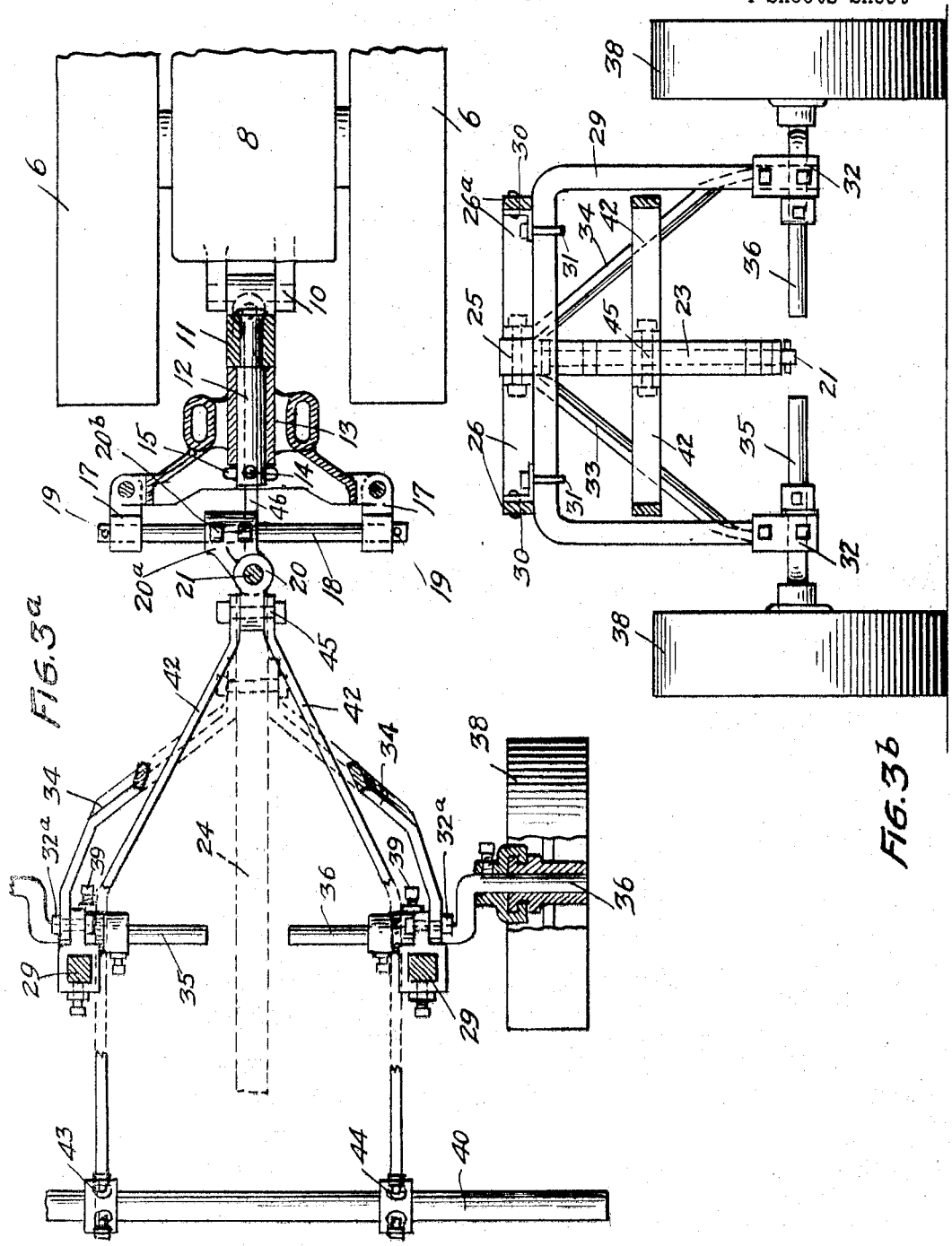

1,633,850

UNITED STATES PATENT OFFICE.

FORREST V. DONALD, OF MINNEAPOLIS, MINNESOTA, ASSIGNOR, BY MESNE ASSIGNMENTS, TO NEW BEEMAN TRACTOR COMPANY, OF MINNEAPOLIS, MINNESOTA, A CORPORATION OF MINNESOTA.

FOUR-WHEELED TRACTOR.

Application filed January 3, 1921. Serial No. 434,562.

My invention relates to the type of four-wheeled tractors in which the two front wheels are the motor driven members or drivers and the two rear wheels act as idle running trailers supporting the rear end of the machine and taking up the reactive force of the torque of the engine driving the front wheels. In such machines I have found that the trailer wheels must be placed a considerable distance in the rear of the axis of the driving wheels in order to prevent excessive downward pressure resulting from the reaction of the torque of the engine when pulling a heavy load, and I have found that when these wheels are mounted on a single axle, the king bolt around which the axle turns and which receives the full downward force of the driving and reacting torque should, for the same reason, be located well to the rear of the front axle, but not so near to the rear axle that the rear wheels and the implements attached to the tractor will move outwards when turning a sharp corner; therefore the king-bolt or joint should be located about midway between the axles. When turning sharp corners with the tractor, the king-bolt joint in this position will swing a considerable distance to either one side or the other of the center of the tractor and when in this position the two axles will be at an obtuse angle to each other and the force of the engine torque reacting downward against the joint will twist it and tilt the rear wheels, unless the frame supporting them is constructed so that it will preserve its rigidity under severe tension or twisting stresses.

The object of the invention, therefore, is to produce a tractor frame having a joint between the two axles which will swing laterally when steering and which will resist torsional stresses and preserve rigidity under all conditions.

A further object is to provide universal jointed means for attaching farm implements of various descriptions to this frame and means for laterally adjusting the joint and steering the tractor.

Further objects will appear from the following detailed description, taken in connection with the accompanying drawings.

The invention consists generally in various constructions and combinations. all as hereinafter described and particularly pointed out in the claims.

In the drawings:

Figure 1 is a side elevation, with one wheel removed, of a small tractor of the handle-bar steering type, embodying my invention and shown in a position for moving straight ahead;

Figure 2 is a plan view of the tractor, showing the machine as it appears when turning a sharp corner;

Figure $3^a$ is a detail on section line $3^a$—$3^a$ of Figure 1;

Figure $3^b$ is a detail on section line $3^b$—$3^b$ of Figure 1;

Figure 4 shows a modified form of wheel steering and control applied to the tractor;

Figure 5 is a detail of wheel steering device.

The tractor illustrated and described in Figures 1 to $3^b$ is preferably of the garden type, which is steered by the walking operator grasping the handle bars connected by steering posts to the front or motor frame. The driving and steering wheels 6 are mounted upon the axle 7 of the engine frame 8, to which is attached, at 9 and 10, the frame member 11 having the rearwardly projecting pin 12 upon which the draw-bar yoke 13 is swiveled, held by a pin 14 in a slot 15. To each end of the draw-bar yoke 13 is preferably connected a clevis 17 and a rod 18 passes horizontally through the two clevises and is preferably held therein against lateral movement by pins 19 or other equivalent means. A knuckle bar 20 is supported on the rod 18 by a boss $20^a$ and secured thereto for lateral adjustment preferably by set screws $20^b$. The rear or trailer frame is connected to the knuckle bar 20 by means of the long vertical king bolt 21 passing through the knuckle lugs $20^c$ and $20^d$ and the fork members 22 and 23 and the point of connection between the trailer frame and the front driving frame may therefore be laterally changed by adjusting the knuckle bar 20 on the horizontal rod 18.

The adjustment of the bar 20 laterally adapts the machine for use with any type of ground-working implement desired, as the draft member positioned in the center of the rod 18 or at either side of the center enables the user of the machine to do the work required. This laterally adjustable feature of the machine has no particular function or effect in resisting the downward thrust on the vertical king bolt.

The fork members 22 and 23 are rigidly secured to a central supporting bar 24, preferably by means of bolts 25, the bar 24 and fork member 22 being arranged at the upper level of the knuckle bar 20 and the lower fork member 23 being bent upwards to meet the bar 24 and fork member 22. Diagonal braces 26 and 26ª are secured to the bar 24, preferably by bolts 27 and 28 and extend rearwards to a yoke bar 29 to which they are rigidly secured by angle plates 30 and U-bolts 31. The yoke bar 29 is shaped in the form of an inverted U and carries at its lower ends securely fastened collars 32 which are connected by bolts 32ª to the diagonal cross braces 33 and 34, which slant forward, upwards and inwards and are secured to the central frame 24 by bolts 28. The axles 35 and 36 upon which the rear wheels 37 and 38 are mounted are adjustably secured by means of set screws 39 in suitable horizontal apertures provided in the collars 32 and I also provide for vertical adjustment of the tractor frame by offsetting the wheel journal from the supporting portion of the axles. By this construction the tread of the wheels may be adjustable by sliding the axles horizontally through the supporting collars 32 and vertically by turning the axles in the apertures of the collars and securing them in the desired position by the set screws 39. When it is desired to have a very narrow tread to the rear wheels, as for cultivating garden vegetables or the like, the axles 35 and 36 may be removed from the collars 32 and inserted from the inside of the collars, bringing the wheels close together to pass between the rows of vegetables.

In the drawings, I have illustrated attached to the tractor an ordinary cultivator frame 40 having cultivators 41. The frame 40 is attached direct to the king-bolt by means of a draw-bar 42 rigidly connected to the cultivator frame at 43 and 44 and having pivoted connections at 45 to a collar 46 secured upon the king-bolt 21.

The draw-bar 42 may be of any preferred form to suit the implements but is shown as composed of two members separated at their fastening points 43 and 44 and passing just inside the vertical members of the yoke bar 29 converging to the pivot point 45.

The king-bolt 21 depends below the bar 20 and is provided with a plate 46 having an ear 46' to receive the threaded end of a rod 46". The forward end of the rod 46" engages an eye 49 in the frame member 11 for oscillation thereon and the threaded end of said rod is provided with lock nuts by means of which the effective length of the rod may be increased or decreased to allow for lateral adjustment of the bar 20 on the horizontal rod 18.

To the upper end of the member 11 are pivotally connected at 50 the steering posts 51 and 51ª, terminating in handles 52 and 52ª by which the tractor is steered. The posts are supported, in a convenient position for the operator, by vertical bars 53, secured to the posts and preferably connected at their lower ends by a cross bar 54, normally resting on a rearwardly projecting tongue 57 that is secured to the under side of the central frame bar 24. A hand lever 58 having a suitable lock device 59 operating in a notched quadrant 60 is supported upon a projecting end 26ᵇ of the brace 26ª and is provided with a crank arm 61 connected to a link 62 and eye bolt 63. This bolt passes loosely through a block 64 pivoted to one member of the draw-bar 42 and is provided with a pin 65, collar 66 and spring 67. By these means the ground-working implements may be lifted from the ground and their tension adjusted.

When it is desired to turn the tractor sharply the steering posts are disengaged from the tongue and swung to one or the other side, as shown in Figure 2, and it will be readily understood from the above description and reference to Figure 1 that when the reactive force of the engine torque is applied to the knuckle bar 20 it is impossible to move it downwards in the direction of the arrow A by reason of the position of the upward diagonal braces 33 and 34, the fork member 24 and the king-bolt 21 without moving the lower end of the king-bolt and the rear wheels backwards in the direction of the arrow B. As this backward movement is positively prevented by the auxiliary draw-bar 46", the result is a perfectly rigid non-tilting frame under all conditions of steering and working positions of the tractor.

In Figure 4 I have illustrated the same frame construction as slightly modified when hand-wheel steering mechanism operated from a driver's seat is applied to the tractor. The handle bars are then removed from their sockets 68 quadrants 69 having a shank 70 are inserted in the sockets and secured by a set screw 71. Suitable hand levers 72 for clutch and throttle control are arranged on the quadrants 69, taking the place of the throttle and clutch control levers 70 and 71ª on the handle bars 52ª. An internal segmental gear 72 having a central hub 73 mounted upon the king-bolt 21 and supporting arms 74 and 75 mounted on the pin 18, is mounted below the frame 24, and a steering post 74ª having a suitable hand wheel 75 is journaled in bearings in the bar 24 and is provided with a collar 76 and a pinion 77 meshing with the segment 73. A suitable driver's seat 78 is arranged upon the frame bar 24, preferably being secured thereto by the same bolts holding the forked member 24. The construction of the rear frame to secure rigidity is substantially the same as in Figure 1.

It is evident that by operating the steering wheel 75 the king bolt 21 may be swung to either one or the other side to make the tractor assume the same position as in Figure 1 and that the reactive pressure of the engine torque is taken up in the same way.

I claim as my invention:

1. A four wheel tractor comprising an internal combustion engine, supporting tractive means therefor, a trailer frame and supporting wheels therefor, a king-bolt forming a vertical pivotal connection substantially midway between said trailer frame and said engine, means for oscillating said engine on a vertical axis to steer the machine, and means cooperating with said king-bolt and said frame to resist buckling downward thrust on said king-bolt resulting from the reactive forces of the torque of the engine while turning the machine.

2. A traction machine comprising an internal combustion engine having supporting traction means, a frame pivotally connected with said engine and having supporting wheels, means for oscillating said engine on a vertical axis and shifting the pivotal connection of said frame laterally to guide the machine, and braces included in said frame for resisting the downward tilting thrust of said engine on said pivotal connection.

3. A traction machine comprising an internal combustion engine having supporting traction means, a frame having supporting wheels and a vertical pivotal connection with said engine, means for oscillating said engine on a vertical axis and shifting the pivotal connection of said frame laterally to guide the machine, braces included in said frame, and means connecting the lower portion of the pivot between said frame and engine with said engine to co-operate with said braces and resist the downward thrust of the reactive forces of the engine on said pivotal connection.

4. A four wheel tractor comprising an internal combustion engine, traction wheels journaled thereon, a trailer frame and supporting wheels therefor, a king-bolt forming a vertical pivotal connection between said trailer frame and said engine, means for oscillating said engine on a vertical axis to steer the machine, a drag bar connected with the upper portion of said king-bolt and a link pivotally connecting the lower portion of said king-bolt with said engine and co-operating with said frame to resist the downward thrust on said king-bolt resulting from the reactive forces of the torque of the engine.

5. A four wheel tractor comprising an internal combustion engine, supporting tractive means therefor, a bar mounted for horizontal transverse adjustment with respect to said engine, a king-bolt mounted vertically in said bar, a trailer frame connected to said king-bolt and having supporting wheels, mechanism for shifting said king-bolt laterally to oscillate said engine on a vertical axis and steer the machine, and mechanism for resisting the downward thrust on said king-bolt resulting from the reactive force of the engine and preventing the tilting of said trailer frame.

6. A four wheel tractor comprising an internal combustion engine, supporting tractive means therefor, a bar pivotally connected with said engine, a king-bolt vertically mounted in said bar, a trailer frame connected with the upper and lower ends of said king-bolt and having supporting wheels, means for oscillating said tractive means on a vertical axis and moving said king-bolt laterally to steer the machine, and means connecting the lower end of said king-bolt with said engine and co-operating with said trailer frame to resist downward and backward thrust on said king-bolt resulting from the reactive force of the engine.

7. A four wheel tractor comprising an internal combustion engine, supporting tractive means therefor, a trailer frame having supporting wheels, a vertical king-bolt connecting said trailer frame with said engine, and steering mechanism for oscillating said king-bolt laterally and swinging said tractive means on a vertical axis to steer the machine, said trailer frame comprising braces connected with the upper and lower portions of said king-bolt, a rearwardly extending bar, a yoke secured to said braces and connected with the bearings of said wheels, forwardly and upwardly inclined braces extending from the bearings of said wheels to the forward portion of said bar, and means connecting the lower portion of said king-bolt with said engine.

8. A machine of the class described comprising a traction means having a source of motive power, a trailer having supporting means and a vertical pivotal connection with said traction means, means for oscillating said pivotal connection from side to side to steer the machine, said pivotal connection being bodily and laterally adjustable to change the position of the line of draft with respect to said traction means.

9. A machine of the class described comprising an internal combustion engine, supporting traction wheels therefor, a trailer having supporting wheels, a coupling having a vertical pivot connecting said trailer with said engine, means for rockng vertical pivot from side to side to turn said traction wheels on a vertical axis and steer the machine, said coupling being mounted for adjustment bodily and laterally to change the position of the line of draft between said traction means and said trailer.

10. A tractor comprising forward traction means and a source of motive power therefor, a trailer frame having supporting means and a vertical pivotal connection between said trailer frame and said source of motive power, said pivotal connection being mounted for lateral adjustment with respect to said forward traction means to change the position of the line of draft.

11. A tractor comprising forward traction means and a source of motive power therefor, a bar mounted transversely of said traction means and connected with said source of motive power, a coupling adjustably supported on said bar, a trailer frame having supporting means and a vertical pivotal connection with said coupling and means for rocking said pivotal connection laterally to turn said forward traction means on a vertical axis and steer the machine.

12. A tractor comprising a forward traction means and a source of motive power therefor, a transverse bar connected with said source of motive power, a coupling mounted on said bar for adjustment laterally with respect to said traction means, a king bolt mounted vertically in said coupling, a trailer frame having supporting means and loosely connected with said king bolt to oscillate therewith and means connected to the lower portion of said king-bolt to prevent tilting of said trailer frame.

13. A tractor comprising forward traction means and a source of motive power therefor, a yoke connected with said source of motive power, a bar supported at its ends in said yoke transversely of said traction means, a coupling adjustable longitudinally on said bar, a trailer frame having supporting means and a pivotal connection with said coupling, the adjustment of said coupling on said bar changing the position of the line of draft with respect to said traction means, for the purpose specified.

14. A four wheel tractor comprising an internal combustion engine, forward supporting wheels therefor, a trailer frame having supporting wheels and a pivotal connection with said engine and means for oscillating said pivotal connection from side to side to steer the machine, said pivotal connection being mounted for bodily adjustment transversely of the machine to change the position of the line of draft to adapt the machine for different types of implements.

15. A four wheel tractor comprising an internal combustion engine, supporting tractive means therefor, a trailer frame and supporting wheels therefor, a king-bolt forming a vertical pivotal connection between said trailer frame and said engine and having bearings adjacent its upper and lower ends, a draw-bar connected to said king-bolt intermediate to its ends, means for oscillating said engine on a vertical axis to swing it out of alignment with said trailer frame to steer the machine, and means for resisting downward thrust on said king bolt resulting from the reactive force of the engine and preventing the tilting of said trailer frame in turning.

In witness whereof, I have hereunto set my hand this 30th day of December, 1920.

FORREST V. DONALD.